(12) United States Patent
Sim et al.

(10) Patent No.: US 10,477,205 B1
(45) Date of Patent: Nov. 12, 2019

(54) METHOD AND AN APPARATUS FOR PROCESSING A VIDEO SIGNAL BASED ON INTER-COMPONENT REFERENCE

(71) Applicant: KWANGWOON UNIVERSITY INDUSTRY-ACADEMY COLLABORATION FOUNDATION, Seoul (KR)

(72) Inventors: Dong Gyu Sim, Seoul (KR); Sea Nae Park, Seoul (KR)

(73) Assignee: KWANGKWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 16/184,350

(22) Filed: Nov. 8, 2018

(30) Foreign Application Priority Data

Jun. 12, 2018 (KR) ........................ 10-2018-0067164

(51) Int. Cl.
*H04N 19/115* (2014.01)
*H04N 19/44* (2014.01)
*H04N 19/186* (2014.01)
*H04N 19/176* (2014.01)

(52) U.S. Cl.
CPC ......... *H04N 19/115* (2014.11); *H04N 19/176* (2014.11); *H04N 19/186* (2014.11); *H04N 19/44* (2014.11)

(58) Field of Classification Search
CPC .... H04N 19/115; H04N 19/176; H04N 19/44; H04N 19/186
See application file for complete search history.

(56) References Cited

U.S. PATENT DOCUMENTS

| | | | |
|---|---|---|---|
| 9,674,521 B2 | 6/2017 | Lee et al. | |
| 2014/0140401 A1 | 5/2014 | Lee et al. | |
| 2017/0105025 A1* | 4/2017 | Jeon | G06T 9/004 |

FOREIGN PATENT DOCUMENTS

KR 101756843 B1 1/2013

OTHER PUBLICATIONS

Liu, Shan, Ximin Zhang, and Shawmin Lei. "Rectangular partitioning for Intra prediction in HEVC." Visual Communications and Image Processing (VCIP), 2012 IEEE. IEEE, 2012 (Year: 2012).*
Zhang, Tao, et al. "Improving chroma intra prediction for HEVC." Multimedia & Expo Workshops (ICMEW), 2016 IEEE International Conference on. IEEE, 2016 (Year: 2016).*
D. Gyu et al., Korean Notice of Allowance, KR10-2018-0067164, dated Dec. 7, 2018, 4 pgs.
K. Zhang, et al. Enhanced Cross-Component Linear Model for Chroma Intra-Prediction in Video Coding. IEEE Trans. on Image Processing. Apr. 26, 2018. vol. 27, No. 8, pp. 3983-3997.

(Continued)

*Primary Examiner* — Tat C Chio
(74) *Attorney, Agent, or Firm* — Morgan, Lewis & Bockius LLP

(57) ABSTRACT

A method and apparatus for processing a video signal according to the present invention derives a first prediction value of a chrominance block using a sample of a luminance block, calculates a compensation parameter based on a predetermined reference area, derives a second prediction value of a chrominance block, and reconstructs a chrominance block based on a second prediction value of a chrominance block.

8 Claims, 8 Drawing Sheets

(56) References Cited

OTHER PUBLICATIONS

Lee et al., Intra Prediction Mode Dependent Reference Sample Selection Method for Cross-Component Linear Model (2018) Korean Society of Broad Engineers Summer Conference. Jun. 2018, pp. 188-189.

X. Zhang, et al. Chroma Intra Prediction Based on Inter-Channel Correlation for HEVC. IEEE Trans. on Image Processing. Jan. 2014. vol. 23, No. 1, pp. 274-286.

* cited by examiner

METHOD AND AN APPARATUS FOR PROCESSING A VIDEO SIGNAL BASED ON INTER-COMPONENT REFERENCE

RELATED APPLICATION

This application claims priority to Korean Application 10-2018-0067164, filed on Jun. 12, 2018, which is hereby incorporated by reference in its entirety.

TECHNICAL FIELD

The present invention relates to a method and apparatus for encoding/decoding a video signal.

BACKGROUND

The demand for high resolution, high quality video is increasing in various applications. As the image data becomes high resolution and high quality, the data amount increases relative to the conventional image data. Therefore, when image data is transmitted using a medium such as a conventional wired/wireless broadband line or is stored using a conventional storage medium, the transmission cost and the storage cost are increased. High-efficiency image compression techniques may be utilized to solve these problems caused by the high resolution and high quality of image data.

SUMMARY

An object of the present invention is to improve encoding/decoding efficiency of a prediction block.

An object of the present invention is to improve the accuracy of intra prediction for each component.

An object of the present invention is to improve encoding/decoding efficiency through adaptive block division.

A method and apparatus for processing a video signal according to the present invention derives a first prediction value of a chrominance block using a sample of a luminance block, calculates a compensation parameter based on a predetermined reference area, derives a second prediction value of the chrominance block, and reconstructs the chrominance block based on the second prediction value of the chrominance block.

In the video signal processing method and apparatus according to the present invention, the calculating step may further include determining a reference area to be referred to for calculating the compensation parameter.

In the video signal processing method and apparatus according to the present invention, the reference area may be determined for at least one of the luminance block or the chrominance block.

In the video signal processing method and apparatus according to the present invention, the compensation parameter may be calculated based on at least one of a representative value of a reference area of the luminance block or a representative value of a reference area of the chrominance block.

In the video signal processing method and apparatus according to the present invention, the representative value may be derived as one of an average value, a minimum value, a maximum value, a mode value, or a median value of all or a part of samples belonging to the reference area.

In the video signal processing method and apparatus according to the present invention, the step of deriving the first prediction value may be selectively performed based on information indicating whether the chrominance block is decoded through inter-component reference-based prediction.

In the video signal processing method and apparatus according to the present invention, the chrominance block may be a first chrominance block (Cr block) and the second chrominance block (Cb block) may be reconstructed using a sample of the first chrominance block.

In the video signal processing method and apparatus according to the present invention, the luminance block or the chrominance block may be a block divided into a variable size/shape, based on at least one of a quadtree, a binary tree or a triple tree.

According to the present invention, prediction encoding/decoding efficiency may be improved through inter-component reference-based prediction.

Also, according to the present invention, encoding/decoding efficiency may be improved through block division of a tree structure.

DETAILED DESCRIPTION

Figure 1:
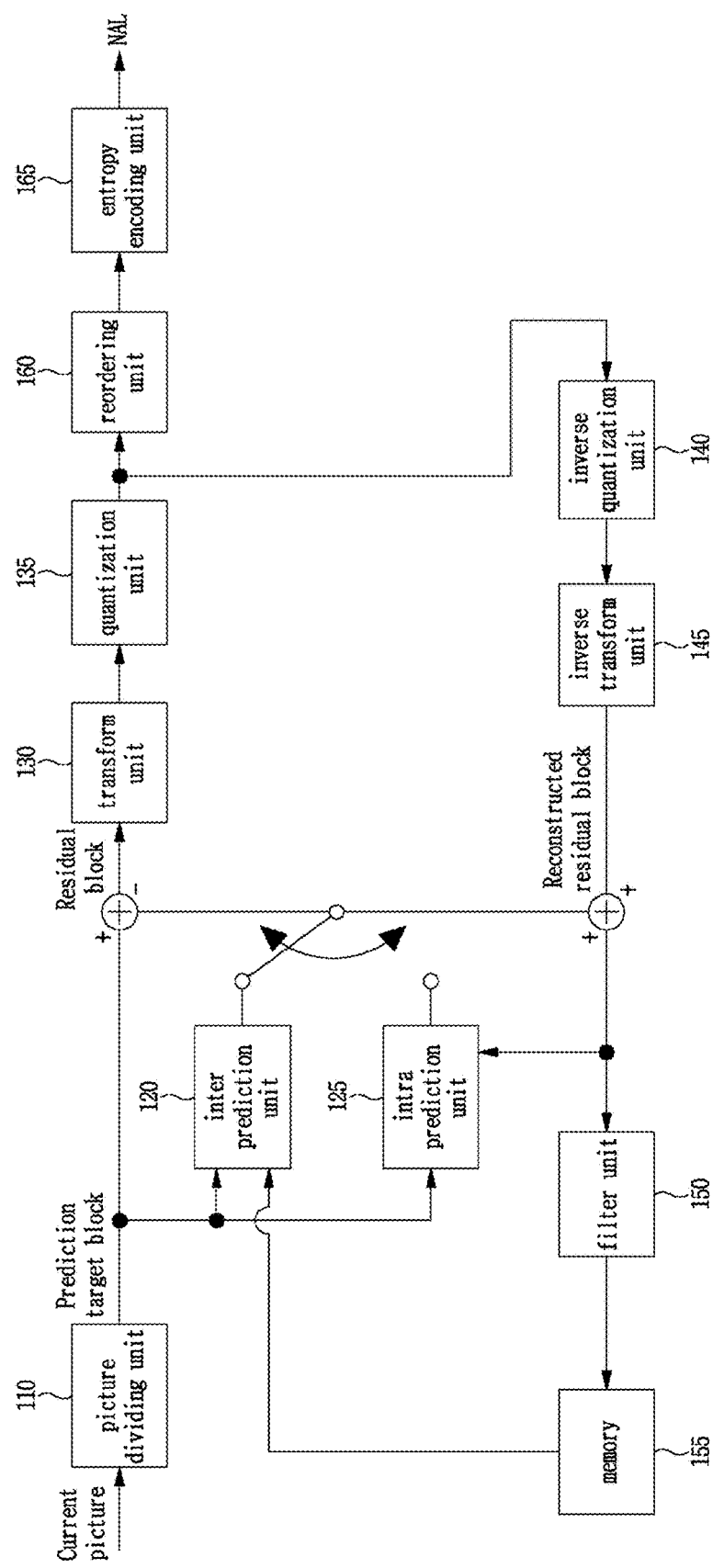
FIG. 1 is a block diagram illustrating an encoding apparatus according to an embodiment of the present invention.

A method and apparatus for processing a video signal according to the present invention derives a first prediction value of a chrominance block using a sample of a luminance block, calculates a compensation parameter based on a predetermined reference area, derives a second prediction value of the chrominance block, and reconstructs the chrominance block based on the second prediction value of the chrominance block.

In the video signal processing method and apparatus according to the present invention, the calculating step may further include determining a reference area to be referred to for calculating the compensation parameter.

In the video signal processing method and apparatus according to the present invention, the reference area may be determined for at least one of the luminance block or the chrominance block.

In the video signal processing method and apparatus according to the present invention, the compensation parameter may be calculated based on at least one of a representative value of a reference area of the luminance block or a representative value of a reference area of the chrominance block.

In the video signal processing method and apparatus according to the present invention, the representative value may be derived as one of an average value, a minimum value, a maximum value, a mode value, or a median value of all or a part of samples belonging to the reference area.

In the video signal processing method and apparatus according to the present invention, the step of deriving the first prediction value may be selectively performed based on information indicating whether the chrominance block is decoded through inter-component reference-based prediction.

In the video signal processing method and apparatus according to the present invention, the chrominance block may be a first chrominance block (Cr block) and the second chrominance block (Cb block) may be reconstructed using a sample of the first chrominance block.

In the video signal processing method and apparatus according to the present invention, the luminance block or the chrominance block may be a block divided into a variable size/shape, based on at least one of a quadtree, a binary tree or a triple tree.

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating an encoding apparatus according to an embodiment of the present invention.

Referring to FIG. 1, the encoding apparatus 100 includes a picture dividing unit 110, prediction units 120 and 125, a transform unit 130, a quantization unit 135, a reordering unit 160, an entropy encoding unit 165, an inverse quantization unit 140, an inverse transform unit 145, a filter unit 150, and a memory 155.

Each of the elements shown in FIG. 1 is shown independently to represent different characteristic functions in the encoding apparatus, and may mean that each element is composed of separate hardware. But, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture dividing unit 110 may divide an input picture into at least one block. At this time, a block may mean a coding unit (CU), a prediction unit (PU), or a transform unit (TU). The division may be performed based on at least one of a quadtree, a binary tree, or a triple tree. The quadtree is a method of dividing an upper block into sub-blocks whose width and height are half of an upper block. The binary tree is a method of dividing an upper block into sub-blocks whose either width or height is half of an upper block. In a binary tree, a block may have a non-square shape as well as a square shape by dividing an upper block based on the above-described binary tree-based division.

In the embodiments of the invention, a CU may be used to refer to not only a unit of encoding but also a unit of decoding.

The prediction units 120 and 125 may include an inter prediction unit 120 to perform inter prediction and an intra prediction unit 125 to perform intra prediction. The prediction units 120 and 125 may determine which of inter prediction and intra prediction is performed on a PU, and may determine specific information (for example, an intra prediction mode, a motion vector, and a reference picture) of the determined prediction method. Here, a processing unit on which prediction is performed may be different from a processing unit for which a prediction method and specific information thereon are determined. For example, a prediction method and a prediction mode may be determined for each PU, while prediction may be performed for each TU. A residual value (residual block) between a generated predicted block and an original block may be input to the transform unit 130. Further, prediction mode information, motion vector information and the like used for prediction may be encoded along with the residual value by the entropy encoding unit 165 and be transmitted to the decoding apparatus. When a specific encoding mode is used, the original block may be encoded and transmitted to the decoding apparatus without generating a prediction block by the prediction units 120 and 125.

The inter prediction unit 120 may predict a PU based on information on at least one picture among a previous picture of a current picture and a subsequent picture of a current picture. In some cases, the inter prediction unit 120 may predict a PU based on information of a partially encoded region in the current picture. The inter prediction unit 120 may include a reference picture interpolation unit, a motion prediction unit, and a motion compensation unit.

The reference picture interpolation unit may be supplied with reference picture information from the memory 155 and generate pixel information less than or equal to an integer pixel on a reference picture. In the case of luminance pixels, a DCT-based 8-tap interpolation filter with a variable filter coefficient may be used to generate pixel information less than or equal to an integer pixel in a unit of a ¼ pixel. In the case of chrominance pixels, a DCT-based 4-tap interpolation filter with a variable filter coefficient may be used to generate pixel information less than or equal to an integer pixel in a unit of a ⅛ pixel.

The motion prediction unit may perform motion prediction on the basis of the reference picture interpolated by the reference picture interpolation unit. Various methods, such as a full search-based block matching algorithm (FBMA), a three-step search (TSS) algorithm and a new three-step search (NTS) algorithm, may be used to calculate a motion vector. A motion vector has a motion vector value in the unit of a ½ or ¼ pixel on the basis of an interpolated pixel. The motion prediction unit may predict a current PU using different motion prediction methods. Various methods, such as skip mode, merge mode, and advanced motion vector prediction (AMVP) mode, etc. may be used as the motion prediction method.

The intra prediction unit 125 may generate a PU on the basis of information on a reference pixel neighboring to a current block. When a reference pixel is a pixel for which inter prediction has been performed because a block neighboring to the current PU is a block for which inter prediction has been performed, information on a reference pixel in the block for which inter prediction has been performed may be replaced with information on a reference pixel in a block for which intra prediction has been performed. That is, when a reference pixel is not available, information on the unavailable reference pixel may be replaced with information on at least one reference pixel of the available reference pixels.

A prediction mode of intra prediction includes a directional prediction mode in which reference pixel information is used according to a prediction direction and a non-directional prediction mode in which information on direction is not used in performing prediction. A mode for predicting a luminance component and a mode for predicting a chrominance component may be different from each other. Further, a chrominance component may be predicted by using either intra prediction mode used to obtain a luminance component or a predicted/reconstructed luminance component.

In the intra prediction method, a predicted block may be generated by applying an adaptive intra smoothing (AIS) filter to the reference pixels according to the intra prediction mode. Different types of AIS filters may be applied to the reference pixels. In the intra prediction method, the intra prediction mode of a current PU may be predicted from an intra prediction mode of a PU neighboring to the current PU. In predicting the prediction mode of the current PU using mode information predicted from a neighboring PU, when the current PU and the neighboring PU have the same intra prediction mode, information indicating that the current PU and the neighboring PU have the same intra prediction mode may be transmitted using predetermined flag information. When the current PU and the neighboring PU have different intra prediction modes, information on the intra prediction mode of the current block may be encoded by entropy encoding.

A residual block including residual information may be generated. The residual information is a difference between an original block and a predicted block generated by the prediction units 120 and 125. The generated residual block may be input to the transform unit 130.

The transform unit 130 may transform the residual block including the residual data by using a transform type such as DCT, DST, or the like. At this time, the transform type may be determined based on the intra prediction mode of the prediction unit used to generate the residual block.

The quantization unit 135 may quantize values transformed into a frequency domain by the transform unit 130. A quantization coefficient may be changed depending on a block or importance of an image. Values output from the quantization unit 135 may be provided to the inverse quantization unit 140 and the rearrangement unit 160.

The rearrangement unit 160 may perform the rearrangement of the coefficient values on the quantized residual block.

The rearrangement unit 160 may change coefficients of a two-dimensional (2D) block into coefficients of a one-dimensional (1D) vector through coefficient scanning method. For example, the rearrangement unit 160 may scan a DC coefficient to a coefficient in the high-frequency region using a predetermined scan type, and change it into a one-dimensional vector form.

The entropy encoding unit 165 may perform entropy encoding on the basis of the values obtained by the rearrangement unit 160. Various encoding methods, such as exponential Golomb coding, context-adaptive variable length coding (CAVLC), or context-adaptive binary arithmetic coding (CABAC), may be used for entropy encoding.

The entropy encoding unit 165 may encode a variety of information, such as residual coefficient information and block type information on a CU, prediction mode information, partitioning unit information, PU information, transfer unit information, motion vector information, reference frame information, block interpolation information and filtering information from the rearrangement unit 160 and the prediction units 120 and 125.

The entropy encoding unit 165 may entropy-encode coefficients of a CU input from the rearrangement unit 160.

The inverse quantization unit 140 and the inverse transform unit 145 dequantize the values which are quantized by the quantization unit 135 and inverse-transform the values which are transformed by the transform unit 130. A reconstructed block may be generated by adding the residual values to the predicted PU. The residual values may be generated by the inverse quantization unit 140 and the inverse transform unit 145. The predicted PU may be predicted by the motion vector prediction unit, the motion compensation unit, and the intra prediction unit of the prediction units 120 and 125.

The filter unit 150 may include at least one of a deblocking filter, an offset unit, and an adaptive loop filter (ALF).

The deblocking filter may remove block distortion generated by boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset unit may apply the offset with respect to the original image to the deblocking filtered image, in units of pixels. A region to which the offset may be applied may be determined after partitioning pixels of a picture into a predetermined number of regions. The offset may be applied to the determined region in consideration of edge information on each pixel or the method of applying the offset to the determined region.

The ALF may perform filtering based on a comparison result of the filtered reconstructed image and the original image. Pixels included in an image may be partitioned into predetermined groups, a filter to be applied to each group may be determined, and differential filtering may be performed for each group. Information on whether to apply the ALF may be transferred by each coding unit (CU) and a shape and filter coefficients of an ALF to be applied to each block may vary. Further, an ALF with the same form (fixed form) may be applied to a block regardless of characteristics of the block.

The memory 155 may store a reconstructed block or picture output from the filter unit 150, and the stored reconstructed block or picture may be supplied to the prediction units 120 and 125 when performing inter prediction.

Figure 2:
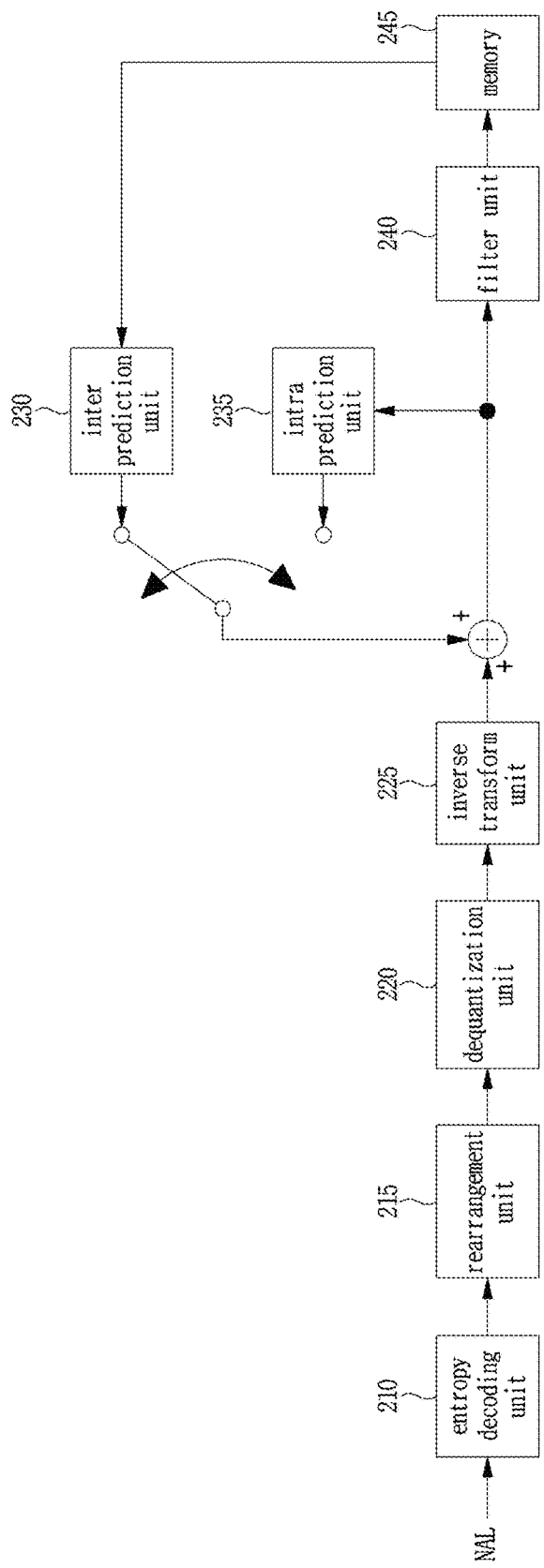
FIG. 2 is a block diagram illustrating a decoding apparatus according an exemplary embodiment of the present invention.

FIG. 2 is a block diagram illustrating a decoding apparatus according an exemplary embodiment of the present invention.

Referring to FIG. 2, the decoding apparatus 200 may include an entropy decoding unit 210, a rearrangement unit 215, a dequantization unit 220, an inverse transform unit 225, prediction units 230 and 235, a filter unit 240, and a memory 245.

Each of the elements shown in FIG. 2 is shown independently to represent different characteristic functions in the decoding apparatus, and may mean that each element is composed of separate hardware. But, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

The entropy decoding unit 210 may perform entropy decoding on the input bitstream. For example, various methods, such as exponential Golomb coding, CAVLC or CABAC, may be used for entropy encoding.

The entropy decoding unit 210 may decode information associated with intra prediction and inter prediction performed by the encoding apparatus.

The rearrangement unit 215 may perform rearrangement on the bitstream entropy-decoded by the entropy decoding unit 210. The rearrangement unit 215 may reconstruct and rearrange coefficients of a 1D vector into coefficients of a 2D block. The rearrangement unit 215 may be provided with information on coefficient scanning performed by the encoding apparatus and may perform rearrangement using a method of inversely scanning the coefficients, on the basis of scanning order performed by the encoding apparatus.

The dequantization unit 220 may perform dequantization on the basis of a quantization parameter and the rearranged coefficients of the block.

The inverse transform unit 225 may perform inverse-transform of the dequantized transform coefficients based on a predetermined transform type. At this time, the transform type may be determined based on at least one of a prediction mode (inter/intra prediction), a size/shape of a block, an intra prediction mode, a component type (luminance/chrominance component), or a partition type (QT, BT, TT, etc.)

The prediction units 230 and 235 may generate a prediction block on the basis of information for generating prediction block and information on a previously-decoded block or picture provided. The information for generating prediction block may be provided from the entropy decoding unit 210. The information on a previously-decoded block or picture may be provided from the memory 245.

The prediction units 230 and 235 may include a PU determination unit, an inter prediction unit and an intra prediction unit. The PU determination unit may receive a variety of information, such as PU information, intra prediction mode-related information of the intra prediction method and motion prediction-related information of an inter prediction method, etc. from the entropy decoding unit 210, may determine a PU for a current CU. The PU determination unit may determine which of the inter prediction and the intra prediction is performed on the PU. An inter prediction unit 230 may perform inter prediction on a current PU on the basis of information on at least one picture among a previous picture and a subsequent picture of a current picture including the current PU. An inter prediction unit 230 may use information necessary for inter prediction for the current PU provided from the encoding apparatus. The inter prediction may be performed on the basis of the information of the pre-reconstructed partial region in the current picture including the current PU. To this end, the pre-reconstructed partial region may be added to the reference picture list.

In order to perform inter prediction, it may be determined, in an unit of a CU, whether a motion prediction method for a PU included in the CU is a skip mode, a merge mode, an AMVP mode or a current picture reference mode.

An intra prediction unit 235 may generate a prediction block on the basis of pixel information in a current picture. When a PU is a PU for which intra prediction is performed, intra prediction may be performed based on intra prediction mode information on the PU provided from the encoding apparatus. The intra prediction unit 235 may include an AIS (Adaptive Intra Smoothing) filter, a reference pixel interpolation unit, and a DC filter. The AIS filter performs filtering on reference pixels of a current block. The AIS filter may decide whether to apply the filter or not, depending on a prediction mode for the current PU. AIS filtering may be performed on the reference pixels of the current block using the prediction mode for the PU and information on the AIS filter provided from the encoding apparatus. When the prediction mode for the current block is a mode not performing AIS filtering, the AIS filter may not be applied.

When the prediction mode for the PU indicates a prediction mode of performing intra prediction on the basis of pixel values obtained by interpolating the reference pixels, the reference pixel interpolation unit may generate reference pixels in a unit of a fractional pixel less than an integer pixel (i.e. full pixel) by interpolating the reference pixels. When the prediction mode for the current PU indicates a prediction mode of generating a prediction block without interpolating the reference pixels, the reference pixels may not be interpolated. The DC filter may generate a prediction block through filtering when the prediction mode for the current block is the DC mode.

The reconstructed block or picture may be provided to the filter unit 240. The filter unit 240 includes a deblocking filter, an offset unit, and an ALF.

The encoding apparatus may provide information on whether the deblocking filter is applied to a corresponding block or picture, and information on which of a strong filter and a weak filter is applied when the deblocking filter is used. The deblocking filter of the decoding apparatus may be provided with information on the deblocking filter from the encoding apparatus and may perform deblocking filtering on a corresponding block.

The offset unit may apply offset to the reconstructed picture on the basis of information on an offset type and offset value applied to the picture in the encoding process.

The ALF may be applied to a CU on the basis of information on whether the ALF is applied and ALF coefficient information, etc. provided from the encoding apparatus. The ALF information may be included and provided in a specific parameter set.

The memory 245 may store the reconstructed picture or block for use as a reference picture or a reference block and may provide the reconstructed picture to an output unit.

Figure 3:
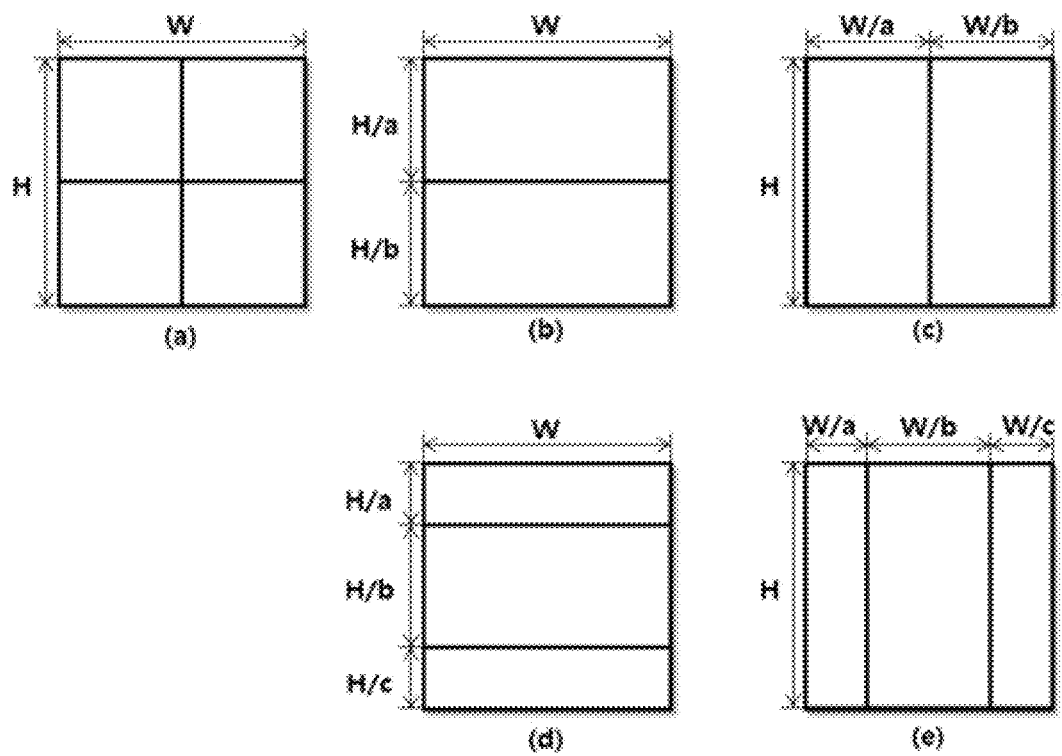
FIG. 3 illustrates a block division type according to an embodiment to which the present invention is applied.

FIG. 3 illustrates a block division type according to an embodiment to which the present invention is applied.

One block (hereinafter, referred to as a first block) may be divided into a plurality of sub-blocks (hereinafter, referred to as a second block) by at least one of a vertical line or a horizontal line. The number of each of the vertical and horizontal lines may be one, two, or more. Here, the first block may be a coding block (CU) which is a basic unit of image encoding/decoding, a prediction block (PU) which is a basic unit of prediction encoding/decoding or a transform block (TU) which is a basic unit of transform encoding/decoding. The first block may be a square block or a non-square block.

The division of the first block may be performed based on a quad tree, a binary tree, a triple tree, etc., and will be described in detail with reference to FIG. 3.

FIG. 3(a) illustrates a quad tree division (QT). QT is a division type in which the first block is divided into four second blocks. For example, when the first block of 2N×2N is divided by QT, the first block may be divided into four second blocks having N×N size. QT may be limited to apply to a square block only, but it is also applicable to a non-square block.

FIG. 3(b) illustrates a horizontal binary tree (hereinafter, referred to as Horizontal BT) division. Horizontal BT is a division type in which the first block is divided into two second blocks by one horizontal line. This division may be performed symmetrically or asymmetrically. For example, when the first block of 2N×2N is divided based on Horizontal BT, the first block may be divided into two second blocks with a height ratio of (a:b). Here, a and b may be the same value, and a may be larger or smaller than b.

FIG. 3(c) illustrates a vertical binary tree (hereinafter, referred to as Vertical BT) division. Vertical BT is a division type in which the first block is divided into two second blocks by one vertical line. This division may be performed symmetrically or asymmetrically. For example, when the first block of 2N×2N is divided based on Vertical BT, the first block may be divided into two second blocks with a width ratio of (a:b). Here, a and b may be the same value, and a may be larger or smaller than b.

FIG. 3(d) illustrates a horizontal triple tree (hereinafter, referred to as Horizontal TT) division. Horizontal TT is a division type in which the first block is divided into three second blocks by two horizontal lines. For example, when the first block of 2N×2N is divided based on Horizontal TT, the first block may be divided into three second blocks with a height ratio of (a:b:c). Here, a, b, and c may be the same value. Alternatively, a and c may be the same, and b may be greater or less than a.

FIG. 3(e) illustrates a vertical triple tree (hereinafter, referred to as Vertical TT) division. Vertical TT is a division type in which the first block is divided into three second blocks by two vertical lines. For example, when the first block of 2N×2N is divided based on Vertical TT, the first block may be divided into three second blocks with a width ratio of (a:b:c). Here, a, b, and c may be the same value or different values. Alternatively, a and c may be the same while b may be greater or less than a. Alternatively, a and b may be the same while c may be greater or less than a. Alternatively, b and c are the same while a may be larger or smaller than b.

The division described above may be performed based on the division information signaled from the encoding apparatus. The division information may include at least one of division type information, division direction information, or division ratio information.

The division type information may specify any one of the division types that are pre-defined in the encoding/decoding apparatus. The pre-defined division type may include at least one of QT, Horizontal BT, Vertical BT, Horizontal TT, Vertical TT, or non-division mode (No split). Alternatively, the division type information may mean information on whether or not QT, BT, or TT is applied, and may be encoded in the form of a flag or an index. In the case of BT or TT, the division direction information may indicate whether it is divided horizontally or vertically. In the case of BT or TT, the division ratio information may indicate the ratio of the width and/or the height of the second block.

Figure 4:
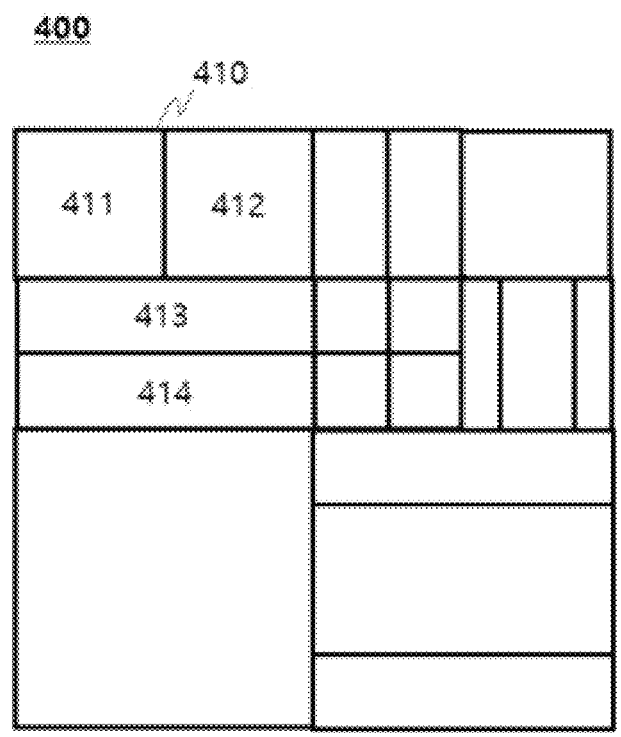
FIG. 4 illustrates a tree structure-based block division method according to an embodiment in which the present invention is applied.

FIG. 4 illustrates a tree structure-based block division method according to an embodiment in which the present invention is applied.

The block 400 illustrated in FIG. 4 is assumed to be a square block (hereinafter, referred to as a first block) having a size of 8N×8N and a division depth k. When the division information of the first block indicates QT division, the first block may be divided into four sub-blocks (hereinafter, referred to as a second block). The second block may have a size of 4N×4N and may have a division depth (k+1).

The four second blocks may be divided again based on either QT, BT, TT, or non-division mode. For example, when the division information of the second block indicates a horizontal binary tree (Horizontal BT), the second block is divided into two sub-blocks (hereinafter, referred to as a third block) as the second block 410 of FIG. 4. At this time, the third block may have a size of 4N×2N and may have a division depth (k+2).

The third block may also be divided again based on either QT, BT, TT, or non-division mode. For example, when the division information of the third block indicates a vertical binary tree (Vertical BT), the third block is divided into two sub-blocks 411 and 412 as illustrated in FIG. 4. At this time, the sub-blocks 411 and 412 may have a size of 2N×2N and a division depth (k+3). Alternatively, when the division information of the third block indicates a horizontal binary tree (Horizontal BT), the third block may be divided into two sub-blocks 413 and 414 as illustrated in FIG. 4. In this case, the sub-blocks 413 and 414 may have a size of 4N×N and a division depth (k+3).

The division may be performed independently or in parallel with the neighboring block, or may be performed sequentially according to a predetermined priority order.

The division information of the current block may be determined depending on at least one of the division information of the upper block of the current block or the division information of the neighboring block. For example, when the second block is divided based on Horizontal BT and the upper third block is divided based on Vertical BT, the lower third block does not need to be divided based on Vertical BT. If the lower third block is divided by Vertical BT, this is the same result as the second block is divided by QT. Therefore, encoding for the division information (particularly, the division direction information) of the lower third block may be skipped, and the decoding apparatus may be set so that the lower third block is divided in the horizontal direction.

The upper block may mean a block having a smaller division depth than the division depth of the current block. For example, when the division depth of the current block is (k+2), the division depth of the upper block may be (k+1). The neighboring block may be a block adjacent to the top or left side of the current block. The neighboring block may be a block having the same division depth as the current block.

The above-described division may be repeatedly performed up to the minimum unit of encoding/decoding. When divided into the minimum unit, the division information for the block is no longer signaled from the encoding apparatus. The information on the minimum unit may include at least one of a size or a shape of the minimum unit. The size of the minimum unit may be expressed by the width, the height, the minimum or maximum value of the width and height, the sum of the width and height, the number of pixels, or the division depth. The information on the minimum unit may be signaled in at least one of a video sequence, a picture, a slice, or a block unit. Alternatively, the information on the minimum unit may be a value pre-defined in the encoding/decoding apparatus. The information on the minimum unit may be signaled for each of CU, PU, and TU. Information on one minimum unit may be applied to CU, PU, and TU equally.

Figure 5:
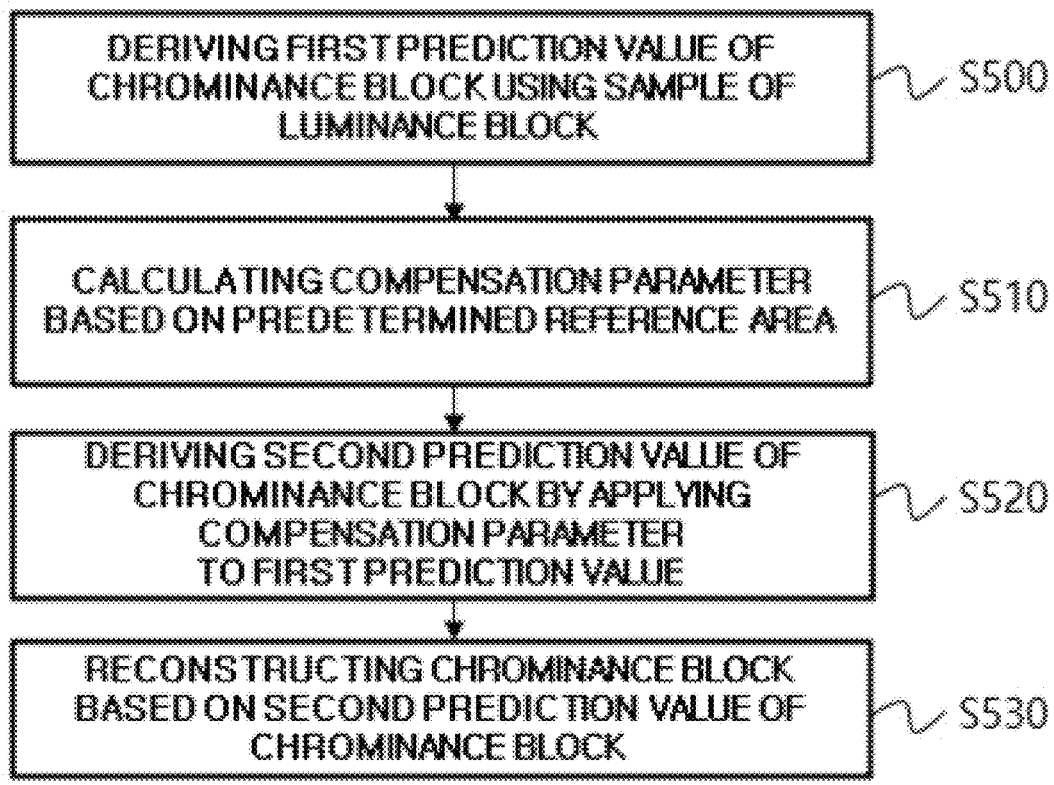
FIG. 5 illustrates a process of reconstructing a chrominance block through inter-component reference according to an embodiment of the present invention.

FIG. 5 illustrates a process of reconstructing a chrominance block through inter-component reference according to an embodiment of the present invention.

The inter-component reference of the present invention may refer to a method of predicting/reconstructing a chrominance component of a current block (hereinafter, referred to as a chrominance block) based on a luminance component of the current block (hereinafter, referred to as a luminance block).

Referring to FIG. 5, a first prediction value of a chrominance block may be derived using a sample of a luminance block (S500).

The sample of the luminance block corresponding to the position of the first prediction value of the chrominance block may be set as the first prediction value of the chrominance block. Alternatively, the first prediction value may be derived by resizing the luminance block to a resolution of the chrominance block. The resizing may be performed based on filtering such as down-sampling or sub-sampling.

On the other hand, there may be a case where a chrominance block corresponds to a plurality of luminance blocks. In this case, a process of determining an area corresponding to the chrominance block in a plurality of luminance blocks may be accompanied, and this will be described with reference to FIG. 8.

The sample of the luminance block may be a prediction value or a reconstruction value. The prediction value may be obtained through intra prediction or inter prediction. The reconstruction value may be a first value obtained by adding a residual sample (Residual, Residual value) to the prediction value or a second value obtained by applying an in-loop filter to the first value.

The intra prediction may be performed based on a predetermined intra prediction mode and a neighboring area of the luminance block.

The intra prediction mode may be determined to be one of two non-directional modes and p directional modes. Here, p may be 33, 65, 129 or more. The p may be a fixed value pre-defined to the encoding/decoding apparatus, or may be variably determined based on the encoding information. Here, the encoding information may include not only information encoded and signaled by the encoding apparatus but also information derived in the decoding apparatus, based on the signaled information. For example, the encoding information may include at least one of a block size/shape, a block availability, a division type, a division count, a component type, a prediction mode, information on an intra prediction mode, an inter mode, motion information, a transform type, a transform skip mode, information about non-zero residual coefficients, scan order, color format, in-loop filter information, and the like.

The block size may be expressed by any one of a width and a height, a minimum value/maximum value of a width and a height, a sum of a width and a height, the number of samples belonging to a block, and the like. The availability of the block may be determined in consideration of the block position, the range of the parallel processing area, the decoding order, and the like. The prediction mode may mean information indicating an intra mode or an inter mode. The information on the intra prediction mode includes information relating to whether the intra prediction mode is the non-directional mode, whether the intra prediction mode is the vertical/horizontal mode, the directionality of the intra prediction mode, the number of intra prediction modes pre-defined in the encoding/decoding apparatus, and the like. The inter mode may mean information indicating a merge/skip mode, an AMVP mode, or a current picture reference mode. The current picture reference mode refers to a method of predicting a current block using the pre-reconstructed area of the current picture. The current picture may be a picture to which the current block belongs. The current picture may be added to a reference picture list for inter prediction, and the current picture may be arranged, in a reference picture list, after a short-term reference picture or a long-term reference picture. The motion information may include a prediction direction flag, a motion vector, a reference picture index, and the like. The encoding information may be related to a current block and/or a neighboring block.

The neighboring area may be an area reconstructed before the luminance block in accordance with the decoding order, and may include at least one of a left side, a top side, a right side, a bottom side, or a region adjacent to each corner of the luminance block.

The neighboring region may include one, two, three, four, or more lines. For example, one or more horizontal lines located at the top of the luminance block may be determined as a neighboring region, and one or more vertical lines located at the left of the luminance block may be determined as a neighboring region. The number of lines belonging to the neighboring area may be a fixed number (for example, one) pre-defined in the encoding/decoding apparatus, or may be variably determined based on the encoding information. Here, the encoding information may include not only information encoded and signaled by the encoding apparatus but also information derived in the decoding apparatus, based on the signaled information. For example, the encoding information may include at least one of a block size/shape, a block availability, a division type, a division count, a component type, a prediction mode, information on an intra prediction mode, an inter mode, motion information, a transform type, a transform skip mode, information about non-zero residual coefficients, scan order, color format, in-loop filter information, and the like.

The block size may be expressed by any one of a width and a height, a minimum value/maximum value of a width and a height, a sum of a width and a height, the number of samples belonging to a block, and the like. The availability of the block may be determined in consideration of the block position, the range of the parallel processing area, the decoding order, and the like. The prediction mode may mean information indicating an intra mode or an inter mode. The information on the intra prediction mode includes information relating to whether the intra prediction mode is the non-directional mode, whether the intra prediction mode is the vertical/horizontal mode, the directionality of the intra prediction mode, the number of intra prediction modes pre-defined in the encoding/decoding apparatus, and the like. The inter mode may mean information indicating a merge/skip mode, an AMVP mode, or a current picture reference mode. The current picture reference mode refers to a method of predicting a current block using the pre-reconstructed area of the current picture. The current picture may be a picture to which the current block belongs. The current picture may be added to a reference picture list for inter prediction, and the current picture may be arranged, in a reference picture list, after a short-term reference picture or a long-term reference picture. The motion information may include a prediction direction flag, a motion vector, a reference picture index, and the like. The encoding information may be related to a current block and/or a neighboring block.

Referring to FIG. 5, a compensation parameter may be calculated based on a predetermined reference area (S510).

The encoding/decoding apparatus may determine an area to be referred to for calculating a compensation parameter of a chrominance block, which is hereinafter referred to as a reference area. A method for determining the reference area will be described with reference to FIG. 6 and FIG. 7.

The reference area may be defined for each component type. That is, the reference area may include at least one of a reference area of a luminance block (hereinafter, referred to as a luminance reference area) or a reference area of a chrominance block (hereinafter, referred to as a chrominance reference area). The chrominance block may include at least one of a Cb block and a Cr block. The reference area may be a pre-reconstructed area adjacent to the block, where the pre-reconstructed area may be a reconstruction area before the in-loop filter is applied, or may be reconstruction area after the in-loop filter is applied.

The compensation parameter may be calculated on the basis that the linearity between the representative value of the luminance reference area and the luminance block is equal to or similar to the linearity between the representative value of the chrominance reference area and the chrominance block. The compensation parameter may be calculated in the form of at least one of a weighting factor, an offset, or a filter coefficient.

The representative value of the luminance reference area may be derived using all or some of the samples belonging to the luminance reference area.

The position of some of the samples may be pre-defined in the encoding/decoding apparatus (first embodiment). For example, the position of some of the samples may be a position adjacent to at least one of the left, top, or top-left of the top-left sample of the luminance block.

The position of some of the samples may be determined depending on the position of the sample of the luminance block (second embodiment). For example, some of the samples may have the same x-coordinate or y-coordinate as the sample of the luminance block.

The some of the samples may be determined depending on the intra prediction mode of the luminance block (third embodiment). For example, the intra prediction mode may be represented by an angular line, where some of the samples may be located on the same angular line as the sample of the luminance block. When an integer sample (integer pel) is not present on the angular line, an integer sample located on both sides of the angular line may be used as the some of the samples.

Some of the samples may be determined through a combination of at least two of the above-described first to third embodiments. The number of some of the samples may be one, two, three, four, five, or more. The number may be a fixed value pre-defined in the encoding/decoding apparatus, and may be variably determined based on a position of a sample of a luminance block, whether the intra prediction mode is a non-directional mode, an angle of a directional mode, a size/shape of a luminance block, or the like.

The representative value may be derived as an average value, a minimum value, a maximum value, a mode value, or an intermediate value of all or some of samples belonging to the luminance reference area. Alternatively, the representative value may be derived by applying a pre-determined filter to all or some of the samples belonging to the luminance reference region. The filter may be pre-defined in the encoding/decoding apparatus.

The pre-defined filter may be one, two, or more, and one of a plurality of filters may be selectively used in consideration of a size/shape of the luminance block, a prediction mode, information on an intra prediction mode, a filter strength, or the like. At least one of a length of the filter, a filter strength or filter coefficients relating to one of a plurality of filters may be different from the other filter. The information on the intra prediction mode includes information relating to whether the intra prediction mode is a non-directional mode, whether the intra prediction mode is a vertical/horizontal mode, a directionality of an intra prediction mode, the number of intra prediction modes pre-defined in the encoding/decoding apparatus, and the like.

The representative value of the chrominance reference area may be derived in the same or similar manner as the representative value of the luminance reference region, and thus a detailed description thereof will be omitted.

Referring to FIG. 5, a second prediction value of the chrominance block may be derived by applying a compensation parameter of S510 to a first prediction value of S500 (S520).

As described above, the compensation parameter may be calculated in the form of a weighting factor and/or an offset. In this case, the second prediction value of the chrominance block may be derived by multiplying the first prediction value by a weighting factor, or may be derived by adding or subtracting an offset to the first prediction value. As shown in Equation (1), the first prediction value may be derived by applying both a weighting factor and an offset.

$$PredC2 = a*PredC1 + b \qquad \text{[Equation 1]}$$

In Equation (1), PredC2 denotes a second prediction value, PredC1 denotes a first prediction value or a sample of a luminance block, and a and b denote a weighting factor and an offset, respectively.

Alternatively, the compensation parameter may be calculated in the form of a filter coefficient of an n-tap filter. The input value of the n-tap filter may include at least one of a first prediction value (or a sample of the luminance block), a representative value of the luminance reference area, or a representative value of the chrominance reference area. The output value of the n-tap filter may be a second prediction value of the chrominance block.

Referring to FIG. 5, the chrominance block may be reconstructed based on the second prediction value of the chrominance block derived in S520 (S530).

In the case of inter-component reference-based prediction, the second prediction value may be set as a reconstruction value. That is, in the case of inter-component reference-based prediction, the decoding apparatus may omit the process of decoding the residual samples. Alternatively, even in the case of inter-component reference-based prediction, a residual value sample may be added to the second prediction value of the chrominance block to generate a reconstruction value of the chrominance block.

On the other hand, the above-described inter-component reference-based prediction method may be selectively performed based on information signaled from the encoding apparatus (first embodiment). The information may indicate whether a chrominance block is decoded through inter-component reference-based prediction, which may be signaled in the form of a flag or index.

Alternatively, the decoding apparatus may determine, based on the predetermined encoding information, whether to decode the chrominance block through inter-component reference-based prediction (second embodiment). Here, the encoding information may include not only information encoded and signaled by the encoding apparatus but also information derived in the decoding apparatus based on the signaled information.

For example, the encoding information may include at least one of a block size/shape, a block availability, a division type, a division count, a component type, a prediction mode, information on an intra prediction mode, an inter mode, motion information, a transform type, a transform skip mode, information about non-zero residual coefficients, scan order, color format, in-loop filter information, and the like.

The block size may be expressed by any one of a width and a height, a minimum value/maximum value of a width and a height, a sum of a width and a height, the number of samples belonging to a block, and the like. The availability of the block may be determined in consideration of the block position, the range of the parallel processing area, the decoding order, and the like. The prediction mode may mean information indicating an intra mode or an inter mode. The information on the intra prediction mode includes information relating to whether the intra prediction mode is the non-directional mode, whether the intra prediction mode is the vertical/horizontal mode, the directionality of the intra prediction mode, the number of intra prediction modes pre-defined in the encoding/decoding apparatus, and the like. The inter mode may mean information indicating a merge/skip mode, an AMVP mode, or a current picture reference mode. The current picture reference mode refers to a method of predicting a current block using the pre-reconstructed area of the current picture. The current picture may be a picture to which the current block belongs. The current picture may be added to a reference picture list for inter prediction, and the current picture may be arranged, in a reference picture list, after a short-term reference picture or a long-term reference picture. The motion information may include a prediction direction flag, a motion vector, a reference picture index, and the like. The encoding information may be related to a current block and/or a neighboring block.

Alternatively, inter-component reference-based prediction may be performed only when the luminance block satisfies a specific condition (third embodiment). As an example of the above specific condition, there may be the following condition: the luminance block is coded in the intra mode, the intra prediction mode of the luminance block is the non-directional mode, the intra prediction mode of the luminance block is the vertical/horizontal mode, the size of the luminance block is equal to or smaller than a predetermined threshold value, the luminance block is coded in the merge/skip mode, the residual coefficient of the luminance block is 0 (e.g., coded_block_flag=0), the number of non-zero residual coefficient belonging to the luminance block is equal to or smaller than a predetermined threshold value, in-loop filter information (e.g., deblocking filter, SAO, ALF) of the luminance block is derived from the in-loop filter information of the neighboring block, and the like. The inter-component reference-based prediction may be selectively performed based on a combination of at least two of the above-described first to third embodiments.

The chrominance block may include a first chrominance block (Cr block) and a second chrominance block (Cb block). The first chrominance block and the second chrominance block may be respectively decoded using the sample of the luminance block, through the inter-component reference-based prediction described above.

Alternatively, inter-component reference-based prediction may be applied between the luminance block and the chrominance block, and may be applied equally/similarly between the first chrominance block and the second chrominance block. In this case, it is possible to predict/reconstruct the first chrominance block using a sample of the luminance block, through the inter-component reference-based prediction. Then, through the inter-component reference-based prediction, the second chrominance block may be predicted/reconstructed using a sample of the first chrominance block.

Alternatively, it is possible to predict/reconstruct the first chrominance block using a sample of the luminance block, through the inter-component reference-based prediction. Then, the second chrominance block may be predicted/reconstructed through the weighted sum of the luminance block and the first chrominance block. The weight for the weighted sum may be calculated on the basis of all or some of the samples of the above-described reference area. Alternatively, the weight may be encoded and signaled by the encoding apparatus, or may be determined to be a predetermined value in the encoding/decoding apparatus.

In the above-described embodiment, it is reconstructed in the order from the first chrominance block to the second chrominance block, but it is also possible to reconstruct in the order from the second chrominance block to the first chrominance block. The order may be determined based on a predetermined order in the encoding/decoding apparatus.

Alternatively, the information specifying the order may be encoded and signaled, and the decoding apparatus may sequentially reconstruct the chrominance block according to the signaled information.

Figure 6:
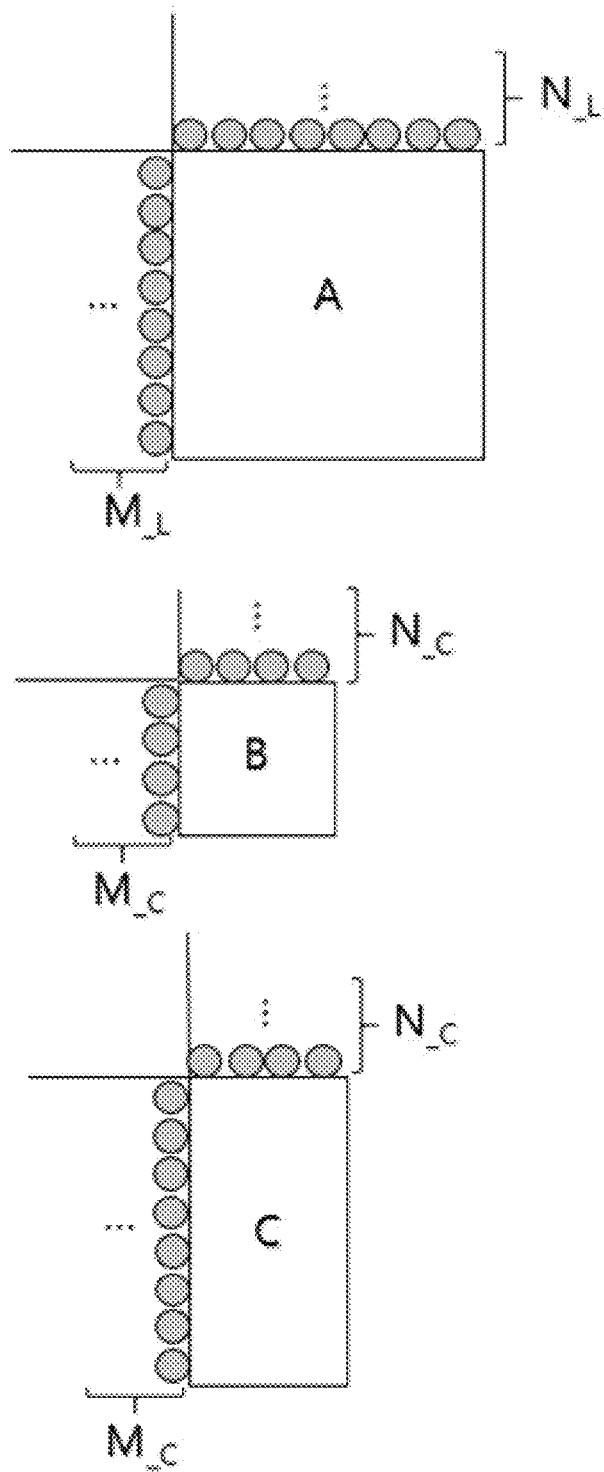
FIGS. 6 and 7 illustrate an example of a reference area for inter-component reference according to an embodiment of the present invention.
Figure 7:
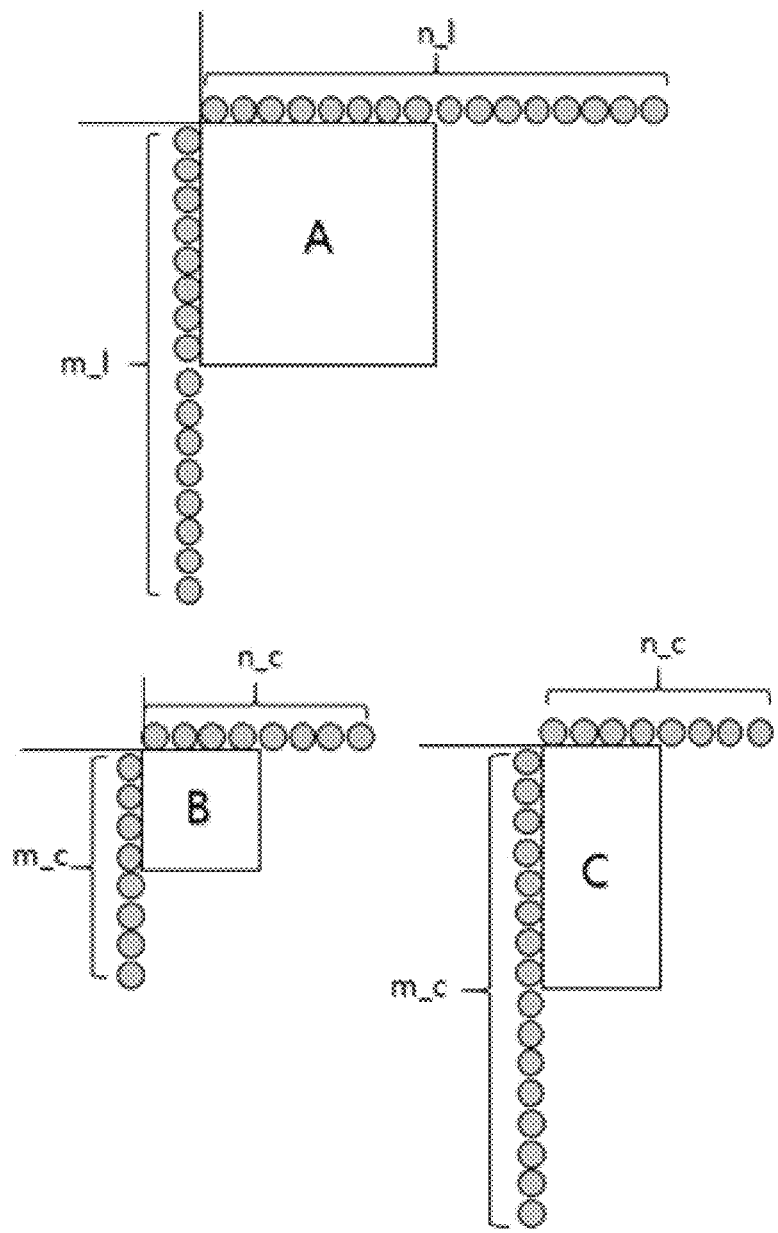

FIGS. 6 and 7 illustrate an example of a reference area for inter-component reference according to an embodiment of the present invention.

A region, which is adjacent to the luminance/chrominance block and is pre-reconstructed before the luminance/chrominance block according to a predetermined decoding order, may be used as a reference area. For example, as illustrated in FIG. 6, a region adjacent to the left or top of the luminance/chrominance block may be used as a reference area. Alternatively, as illustrated in FIG. 7, the reference area may be extended to an area adjacent to the top-right and bottom-left of the luminance/chrominance block. Although not illustrated in FIGS. 6 and 7, an area adjacent to the top-left of the luminance/chrominance block and an area adjacent to the right, bottom, or bottom-right of the luminance/chrominance block may also be used as a reference region. The area may be pre-reconstructed according to the decoding order, before the luminance/chrominance block.

The reference area may be determined based on at least one of encoding information of a luminance block or encoding information of a neighboring block. The determination may comprise determining at least one of the location, number, size (width/height), shape, length relating to the reference area, or priority among the candidate reference areas. The candidate reference area means one or more candidate areas usable as a reference area, and the reference area may be determined as any one of the candidate reference areas. The neighboring block may be a block reconstructed before the luminance block, according to a decoding order. For example, the neighboring block may be a block adjacent to at least one of the left, top, right, bottom, or each corner of the luminance block.

Here, the encoding information may include not only information encoded and signaled by the encoding apparatus but also information derived in the decoding apparatus, based on the signaled information. For example, the encoding information may include at least one of a block size/shape, a block availability, a division type, a division count, a component type, a prediction mode, information on an intra prediction mode, an inter mode, motion information, a transform type, a transform skip mode, information about non-zero residual coefficients, scan order, color format, in-loop filter information, and the like.

The block size may be expressed by any one of a width and a height, a minimum value/maximum value of a width and a height, a sum of a width and a height, the number of samples belonging to a block, and the like. The availability of the block may be determined in consideration of the block position, the range of the parallel processing area, the decoding order, and the like. The prediction mode may mean information indicating an intra mode or an inter mode. The information on the intra prediction mode includes information relating to whether the intra prediction mode is the non-directional mode, whether the intra prediction mode is the vertical/horizontal mode, the directionality of the intra prediction mode, the number of intra prediction modes pre-defined in the encoding/decoding apparatus, and the like. The inter mode may mean information indicating a merge/skip mode, an AMVP mode, or a current picture reference mode. The current picture reference mode refers to a method of predicting a current block using the pre-reconstructed area of the current picture. The current picture may be a picture to which the current block belongs. The current picture may be added to a reference picture list for inter prediction, and the current picture may be arranged, in a reference picture list, after a short-term reference picture or a long-term reference picture. The motion information may include a prediction direction flag, a motion vector, a reference picture index, and the like.

For example, when the luminance block is coded in intra mode, the area of the neighboring sample used for intra prediction may be determined as the reference area of the luminance/chrominance block. Here, when filtering is applied to the neighboring sample in the intra prediction, the reference area of the luminance/chrominance block may be a region of the neighboring sample to which the filtering is applied or a region of the neighboring sample before the filtering is applied. The number of sample lines belonging to the reference area may be set to be equal to the number of sample lines belonging to the area of the neighboring sample, and the reference area may be composed of N or M sample lines different from the area of the neighboring sample.

Alternatively, the encoding information of the luminance block may be derived based on the encoding information of the neighboring block. For example, there are cases that the intra prediction mode of the luminance block is derived from a neighboring block-based MPM (Most Probable Mode), and the luminance block is coded in the merge/skip mode or the AMVP mode, the SAO filter information is derived from the SAO filter information of the neighboring block, and the like. In this case, all or some of the neighboring block may be determined as the reference area.

Alternatively, when the size of the luminance block is smaller than or equal to the threshold value, the left and top reference areas may be used. Otherwise, either the left or top reference area may be used. If the luminance block is N×M non-square (N>M), the top reference area may be used, and if the luminance block is N×M non-square (N<M), the left reference area may be used. When the intra prediction mode of the luminance block is the non-directional mode, the left and top reference areas may be used. Otherwise, either the left or top reference area may be used in consideration of the directionality of the intra prediction mode. In this case, when the directionality is vertical, the top reference area may be used, and when the directionality is horizontal, the left reference area may be used.

Alternatively, information on the reference area may be signaled from the encoding apparatus. The decoding apparatus may determine the reference area based on the signaled information. The information on the reference area is information specifying the reference area. The information on the reference area may include at least one of position, number, size (width/height), shape, length relating to the reference area, or priority information between candidate reference areas. The information may be signaled in at least one of a video sequence, a picture or a predetermined scrap area (e.g., slice, tile, block group, block, etc.).

To this end, when there are m available reference areas, the encoding apparatus may assign 0 to (m−1) indexes to each reference area, and may encode any one of the m reference areas. The encoded information may be signaled for each of the luminance block and the chrominance block, and the luminance block and the chrominance block may use a reference area of a different position from each other. Alternatively, the information may only be signaled for a luminance block. In this case, the reference area of the chrominance block may be determined depending on the signaled information of the luminance block.

According to the above-described method, the reference area may be determined adaptively. However, there may be cases where the determined reference area is unavailable. Here, the unavailable case may mean that the determined reference area is non-decoded or the determined reference area is located outside the picture. In the case of the non-decoding, it may mean that the determined reference area belongs to the same parallel processing area as the luminance/chrominance block, or the determined reference area has a decoding order later than that of the luminance/chrominance block.

Thus, when the determined reference region is unavailable, the reference area may be restricted from being used for the inter-component reference-based prediction. For this purpose, flag information on whether to use the reference area may be used. Alternatively, the unavailable reference area may be replaced with an available reference area. The available reference area may be an area adjacent in a specific direction of the unavailable reference area. The specific direction may be one of left, right, top, bottom, or diagonal. The specific direction may be pre-defined in the encoding/decoding apparatus, or may be variably determined in consideration of the location of the unavailable reference area.

The number of sample lines belonging to the reference area may be one, two, or more. As illustrated in FIG. 6, the top reference area of the luminance block may include NL horizontal lines, and the left reference area may include ML vertical lines. The top reference area of the chrominance block may include NC horizontal lines and the left reference area may include MC vertical lines. At this time, the number of sample lines (NL, NC) in the top reference area may be the same as the number of sample lines (ML, MC) in the left reference area. Alternatively, one of the number of sample lines (NL, NC) in the top reference area and the number of sample lines (ML, MC) in the left reference area may be larger or smaller than the other.

The values of NL, ML, NC, and MC may be integers greater than or equal to zero. The values of NL, ML, NC, and MC may be set to be predetermined values in the encoding/decoding apparatus, or may be variably determined based on the above-described encoding information. Alternatively, information on the number of the sample lines may be encoded and signaled from the encoding apparatus, and the decoding apparatus may determine the values of the NL, ML, NC, and MC based on the signaled information.

On the other hand, the ratio between the number of sample lines belonging to the luminance reference area and the number of sample lines belonging to the chrominance reference area may be determined based on the color format. For example, when the color format is 4:2:0, the ratio (NL:NC or ML:MC) between the number of sample lines belonging to the luminance reference area and the number of sample lines belonging to the chrominance reference area is 2:1.

Up-sampling or down-sampling may be performed on at least one of the luminance reference area and the chrominance reference area, based on the determined ratio. It is possible to adjust the ratio of the reference area between luminance and chrominance through the sampling process.

Also, regardless of the color format, the ratio of the reference area between luminance and chrominance may be 1:1. That is, the number of sample lines belonging to the chrominance reference area may be set depending on the number of reference lines belonging to the luminance reference area (for example, NL=NC or ML=MC). The embodiment relating to the ratio may be applied equally to the ratio between the length of the luminance reference area and the length of the chrominance reference area.

As described above, the reference area may comprise a plurality of sample lines. In this case, some of the samples referred to in FIG. 5 may belong to a single sample line among a plurality of sample lines. Alternatively, at least one of some of the samples may belong to a different sample line from the other.

Meanwhile, the blocks illustrated in FIGS. 6 and 7 are N×N squares, but they do not limit the size or shape of the blocks, and may have various sizes/shapes depending on the division type described above.

Figure 8:
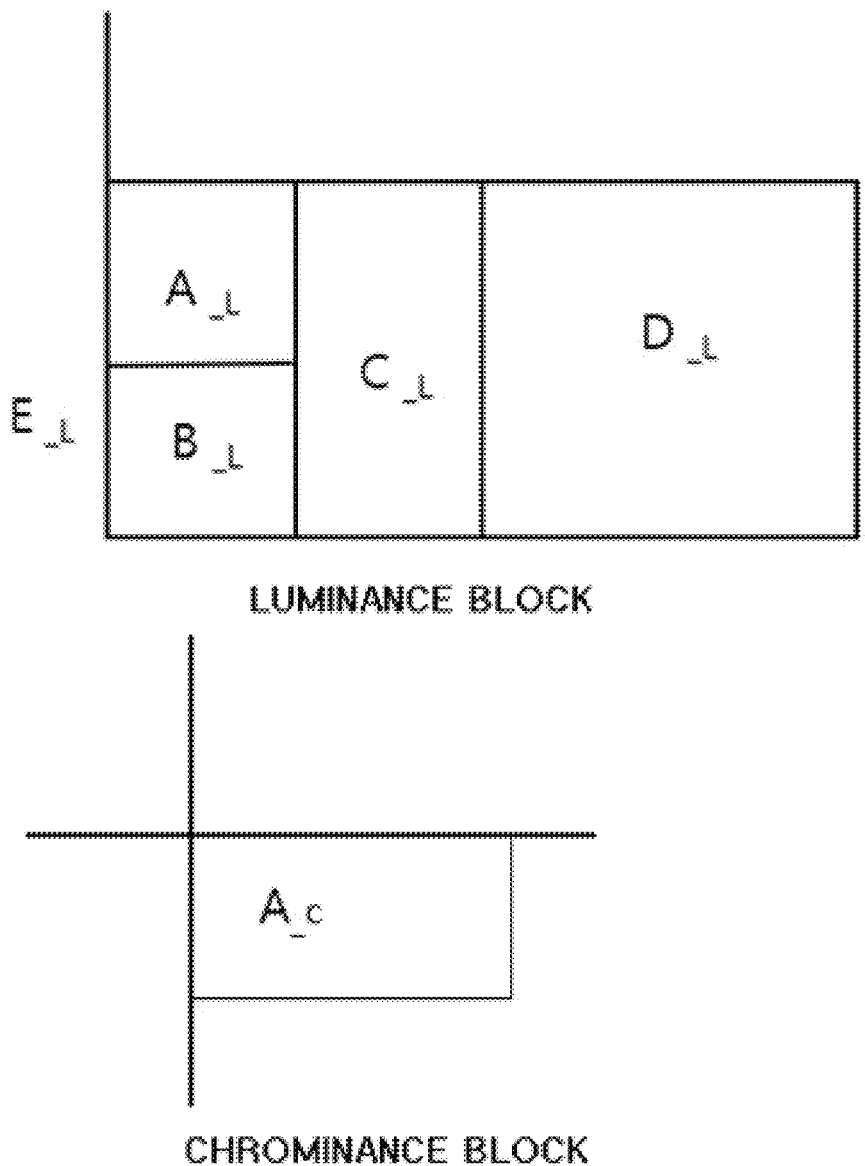
FIG. 8 illustrates a method of determining an area of a luminance block to be used for the inter-component reference of a chrominance block according to an embodiment of the present invention.

FIG. 8 illustrates a method of determining an area of a luminance block to be used for the inter-component reference of a chrominance block according to an embodiment of the present invention.

The encoding/decoding apparatus may determine an area of a luminance block (hereinafter, referred to as a luminance area) to be used for the inter-component reference of a chrominance block. Therefore, the luminance block in the above-described embodiment may be interpreted as a luminance block corresponding to the chrominance block, or may be interpreted as the luminance area.

There may be a case where one chrominance block corresponds to one luminance block (i.e., luminance block: chrominance=1:1). Here, the luminance/chrominance block may be a block that is not further divided. In this case, as illustrated in FIG. 5, the luminance area of the present invention may be determined as a luminance block corresponding to the chrominance block. The determined luminance area may be resized to correspond to the resolution of the chrominance block.

Meanwhile, as illustrated in FIG. 8, there may be the case where one chrominance block corresponds to a luminance block composed of N sub-blocks by at least one of the above-described division type or color format (i.e., luminance block EL:chrominance block AC=N:1). In this case, the luminance area is determined as a luminance block corresponding to the chrominance block, and may be resized to correspond to the resolution of the chrominance block. Alternatively, an area of the luminance block overlapping with the chrominance block may be determined as the luminance area. Alternatively, when the luminance block: chrominance block=N:1, it may be restricted such that the inter-component reference-based prediction is not performed in the decoding apparatus.

Alternatively, there may be the case where a chrominance block composed of M sub-blocks corresponds to a luminance block composed of N sub-blocks by at least one of the above-described division type or color format (i.e., luminance block: chrominance block=N:M). In this case, the luminance area may be determined in consideration of the corresponding relationship between the luminance block and the chrominance block, that is, the corresponding relationship of N:M. Alternatively, an area of the luminance block overlapping with the chrominance block may be determined as the luminance area.

The determined luminance area may include at least one of a block coded in an intra mode or a block coded in an inter mode. If the luminance area includes the blocks coded in the intra and inter mode, respectively, the inter-component reference-based prediction may be restricted from being performed. Alternatively, even when the luminance area includes the blocks coded in the intra and inter mode, it is also possible to calculate the compensation parameters using the neighboring sample of the luminance area. In addition, in the case where a block coded in the inter mode is included in the luminance area, the reference area may be extended as illustrated in FIG. 6, and a detailed description thereof will be omitted.

Alternatively, when the luminance area includes the blocks coded in the intra and inter mode, only neighboring sample of the block coded in the inter mode may be used as the luminance reference area. At this time, only area corresponding to the neighboring sample of the block coded in the inter mode may be determined as the chrominance reference area. Alternatively, when the luminance area includes blocks coded in the intra and inter mode, the encoding apparatus may encode and signal information specifying the luminance/chrominance reference area, and the decoding apparatus may specify the luminance/chrominance reference area based on the information. Alternatively, when the luminance block:chrominance block=N:M, the inter-component reference-based prediction described above may not be performed in the decoding apparatus.

The determination of the luminance area may be performed in consideration of at least one of the division information of the luminance block, the division information of the chrominance block, or the corresponding relation of the division information between the luminance block and the chrominance block. The division information may include at least one of a width, a height, a width-height ratio relating to the divided block, the number of samples belonging to the block, the number of sub-blocks belonging to the block, a shape of the sub-block, or the division type.

The determination of the luminance area may be performed based on a result of comparison between the division information of the luminance block and the division information of the chrominance block. For example, when the division information of the chrominance block is the same as the division information of the luminance block, the luminance area may be determined as a luminance block corresponding to the chrominance block. On the other hand, when the division information of the chrominance block is not the same as the division information of the luminance block, the luminance area may be determined as a partial area of the luminance block by a predetermined rule or information signaled by the encoding apparatus. The information may be information for specifying the luminance area.

Although the exemplary methods of this disclosure are represented by a series of acts for clarity of explanation, they are not intended to limit the order in which the steps are performed, and if necessary, each step may be performed simultaneously or in a different order. In order to implement the method according to the present disclosure, the illustrative steps may additionally include other steps, include the remaining steps except for some steps, or may include additional steps other than some steps.

The various embodiments of the disclosure are not intended to be all-inclusive and are intended to illustrate representative aspects of the disclosure, and the features described in the various embodiments may be applied independently or in a combination of two or more.

In addition, various embodiments of the present disclosure may be implemented by hardware, firmware, software, or a combination thereof. In the case of hardware implementation, the hardware may be implemented by one or more application specific integrated circuits (ASICs), digital signal processors (DSPs), digital signal processing devices (DSPDs), programmable logic devices (PLDs), field programmable gate arrays (FPGAs), general processor, a controller, a micro-controller, a micro-processor, and the like.

The scope of the present disclosure includes a software or machine-executable instructions (e.g., operating system, applications, firmware, program, etc.) which makes operations according to the methods of the various embodiments be performed on the apparatus or computer and a non-transitory computer-readable medium, in which such software or instructions are stored, executable on the apparatus or computer.

What is claimed is:

1. A method of decoding a video signal with a decoding apparatus, comprising:
   predicting, with the decoding apparatus, a chrominance block using a sample of a luminance block, through an inter-component reference-based prediction; and
   reconstructing, with the decoding apparatus, the predicted chrominance block, wherein predicting the chrominance block comprising:
      deriving, with the decoding apparatus, a first prediction value of the chrominance block using the sample of the luminance block;
      calculating, with the decoding apparatus, a compensation parameter based on a pre-determined reference area; and
      deriving, with the decoding apparatus, a second prediction value of the chrominance block by applying the compensation parameter to the first prediction value,
   wherein the reference area is determined to be an area adjacent to a top of the luminance block when the luminance block is N×M non-square, while the reference area is determined to be an area adjacent to a left of the luminance block when the luminance block is M×N non-square, N being greater than M,
   wherein the reference area includes a luminance reference area and a chrominance reference area,
   wherein a ratio between a number of sample lines belonging to the luminance reference area and a number of sample lines belonging to the chrominance reference area is determined based on a color format,
   wherein the compensation parameter is calculated using at least one sample belonging to the luminance reference area,
   wherein a position of the sample belonging to the luminance reference area includes a position adjacent to at least one of a left, a top, or a top-left of a top-left sample of the luminance block, and
   wherein the inter-component reference-based prediction is performed only when an intra prediction mode of the luminance block is one of a vertical mode, a horizontal mode, and a non-directional mode.

2. The method of claim 1, wherein the compensation parameter is calculated based on at least one of a representative value of the luminance reference area or a representative value of the chrominance reference area.

3. The method of claim 2, wherein the representative value is derived as one of an average value, a minimum value, a maximum value, a mode value, or a median value of all or a part of samples belonging to the reference area.

4. The method of claim 1, wherein the chrominance block corresponds to a first chrominance block (Cr block), and
   wherein a second chrominance block (Cb block) is reconstructed using a sample of the reconstructed first chrominance block.

5. A method of encoding a video signal, with an encoding apparatus, comprising:
   predicting, with the encoding apparatus, a chrominance block using a sample of a luminance block, through an inter-component reference-based prediction; and reconstructing, with the encoding apparatus, the predicted chrominance block, wherein predicting the chrominance block comprising:
deriving, with the encoding apparatus, a first prediction value of the chrominance block using the sample of the luminance block;
calculating, with the encoding apparatus, a compensation parameter based on a pre-determined reference area; and
deriving, with the encoding apparatus, a second prediction value of the chrominance block by applying the compensation parameter to the first prediction value,
wherein the reference area is determined to be an area adjacent to a top of the luminance block when the luminance block is N×M non-square, while the reference area is determined to be an area adjacent to a left of the luminance block when the luminance block is M×N non-square, N being greater than M,
wherein the reference area includes a luminance reference area and a chrominance reference area,
wherein a ratio between a number of sample lines belonging to the luminance reference area and a number of sample lines belonging to the chrominance reference area is determined based on a color format,
wherein the compensation parameter is calculated using at least one sample belonging to the luminance reference area,
wherein a position of the sample belonging to the luminance reference area includes a position adjacent to at least one of a left, a top, or a top-left of a top-left sample of the luminance block, and
wherein the inter-component reference-based prediction is performed only when an intra prediction mode of the luminance block is one of a vertical mode, a horizontal mode, and a non-directional mode.

6. The method of claim 5, wherein the compensation parameter is calculated based on at least one of a representative value of the luminance reference area or a representative value of the chrominance reference area.

7. The method of claim 6, wherein the representative value is derived as one of an average value, a minimum value, a maximum value, a mode value, or a median value of all or a part of samples belonging to the reference area.

8. The method of claim 5, wherein the chrominance block corresponds to a first chrominance block (Cr block), and
wherein a second chrominance block (Cb block) is reconstructed using a sample of the reconstructed first chrominance block.

\* \* \* \* \*